UNITED STATES PATENT OFFICE.

AUGUST LEOPOLD LASKA, OF OFFENBACH-ON-THE-MAIN, GERMANY, ASSIGNOR TO CHEMISCHE FABRIK GRIESHEIM-ELEKTRON, OF FRANKFORT-ON-THE-MAIN, GERMANY, A CORPORATION.

SUBSTANTIVE DISAZO DYESTUFF.

988,000.     Specification of Letters Patent.     Patented Mar. 28, 1911.

No Drawing.     Application filed December 13, 1910. Serial No. 597,062.

*To all whom it may concern:*

Be it known that I, AUGUST LEOPOLD LASKA, doctor of philosophy, chemist, a subject of the German Emperor, and resident of Offenbach-on-the-Main, in the Grand Duchy of Hesse, Germany, with the post-office address Gerberstrasse 5, have invented new and useful Improvements in Substantive Disazo Dyestuffs, of which the following is a specification.

I have discovered that new disazo dyestuffs dyeing cotton substantively can be obtained by combining the tetrazo compounds of paradiamins in mineral acid solution with one molecular proportion of 1:8-aminonaphtholdisulfonic acids, containing the $SO_3H$ group not in ortho position to $OH$ and $NH_2$, and with one molecular proportion of a nitrometa-diamin of the benzene series. The thus obtained dyestuffs dye cotton brown shades which, by subsequent treatment with diazotized para-nitranilin are converted in olive-green ones of great coloring power and fastness to soaping. Among the 1:8-aminonaphtholdisulfonic acids the 1:8-aminonaphthol-3:6-disulfonic acid, the 1:8-aminonaphthol-4:6-disulfonic acid and the 1:8-aminonaphthol-3:5-disulfonic acid are considered.

The following examples will serve to illustrate the nature of my invention and how it can be carried out; parts being by weight.

Example I: 9.2 parts of benzidin are dissolved in 300 parts of water and 25 parts of hydrochloric acid 20° Bé. and diazotized in the usual manner. A solution of 17.05 parts of 1:8-aminonaphthol-3:6-disulfonic acid (monosodium salt) in 300 parts of water, neutralized by means of sodium carbonate, is poured into the tetrazo compound. After formation of the intermediate product a solution of 8.5 parts of nitrometaphenylendiamin in 250 parts of water and 20 parts of hydrochloric acid is added and the mixture stirred during 12 hours at the temperature of an ordinary dwelling room. The temperature is then raised to 30° and kept at this point until the formation of dyestuff is completed. The mixture is neutralized by means of sodium carbonate, heated up to 70°, and the dyestuff precipitated by addition of common salt. It is in dry state a blackish powder, dissolving in concentrated sulfuric acid with blue, in water with brown color. It dyes cotton brown shades, which by subsequent treatment with diazotized paranitranilin are converted in olive-green ones of great coloring power and fastness to soaping.

The formation of dyestuff may be performed in the same manner with 1:8-aminonaphthol-4:6-disulfonic acid or 1:8-aminonaphthol-3:5-disulfonic acid, respectively with other nitrometadiamins, for instance nitrotoluylendiamin.

Example II: 12.65 parts of meta-meta$^1$-dichlorobenzidin sulfate ($NH_2:Cl = 1:3$) are dissolved in 500 parts of water and 55 parts of hydrochloric acid 20° Bé., filtered if necessary, and diazotized in the usual manner. A solution of 17.05 parts of 1:8-aminonaphthol-3:6-disulfonic acid (monosodium salt) and 11 parts of sodium acetate in 200 parts of water cooled with ice is poured into the diazo compound; some time afterward a solution of 15 parts of sodium acetate in 100 parts of water is added. After formation of the intermediate product a solution of 8.5 parts of nitro-meta-phenylendiamin in 250 parts of water and 20 parts of hydrochloric acid 20° Bé. is added and the mixture stirred until the formation of dyestuff is completed. The mixture is neutralized by means of sodium carbonate, heated up to 70°, and the dyestuff precipitated by addition of common salt. It is in dry state a blackish powder, soluble in concentrated sulfuric acid with violet, in water with brown color. It dyes cotton brownish shades which, by subsequent treatment with diazotized paranitranilin, are converted in olive-green ones, being much more yellowish, as the shades obtained from the dyestuff described in Example I.

If instead of meta-meta$^1$-dichlorobenzidin ortho-ortho$^1$-dichlorobenzidin ($NH_2:Cl = 1:2$) is used, dyestuffs are obtained which in their tinctorial properties come near the dyestuffs described in Example I.

Now what I claim and desire to secure by Letters Patent is the following:

1. The process for the manufacture of new disazo dyestuffs, consisting in combining the tetrazo compounds of para-diamins in mineral acid solutions with one molecular proportion of 1:8-aminonaphtholsulfonic acids, containing the $SO_3H$ group not in ortho position to $OH$ and $NH_2$ and with one molecular proportion of nitro-meta-diamins of the benzene series.

2. As new articles the dyestuffs obtained by combining the tetrazo compounds of paradiamins in mineral acid solution with one molecular proportion of 1:8-aminonaphtholdisulfonic acids, containing the $SO_3H$ group not in ortho position to the OH and $NH_2$ group, and with one molecular proportion of nitro-meta-diamins of the benzene series, which dyestuffs are blackish powders, soluble in concentrated sulfuric acid with blue to violet, in water with brown color, dyeing cotton brownish shades, which by subsequent treatment with diazotized para-nitranilin are converted into olive-green ones.

3. The process for the manufacture of a new disazo dyestuff, consisting in combining the tetrazo compound of benzidin in mineral acid solution with one molecular proportion of 1:8-aminonaphthol-3:6-disulfonic acid and one molecular proportion of nitro-meta-phenylendiamin.

4. As a new article the dyestuff, obtained by combining the tetrazo compound of benzidin in mineral acid solution with one molecular proportion of 1:8-aminonaphthol-3:6-disulfonic acid and one molecular proportion of nitro-metaphenylenediamin, which dyestuff is a blackish powder, soluble in concentrated sulfuric acid with blue, in water with brown color, dyeing cotton brown shades, which by subsequent treatment with diazotized para-nitranilin are converted into olive-green ones.

In testimony, that I claim the foregoing as my invention, I have signed by name in presence of two witnesses, this second day of December 1910.

AUGUST LEOPOLD LASKA.

Witnesses:
HERMAN WEIL,
EMMA MARX.